US008351006B2

(12) United States Patent
Ryu et al.

(10) Patent No.: US 8,351,006 B2
(45) Date of Patent: Jan. 8, 2013

(54) LIQUID CRYSTAL DISPLAY DEVICE AND FABRICATING METHOD THEREOF

(75) Inventors: Ho Jin Ryu, Gyeonggi-do (KR); Won Ho Lee, Gyeonggi-do (KR); Young Min Jeong, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 794 days.

(21) Appl. No.: 12/153,050

(22) Filed: May 13, 2008

(65) Prior Publication Data

US 2008/0284965 A1    Nov. 20, 2008

(30) Foreign Application Priority Data

May 14, 2007   (KR) .................. 10-2007-0046694
Jul. 25, 2007   (KR) .................. 10-2007-0074487

(51) Int. Cl.
*G02F 1/1343* (2006.01)
(52) U.S. Cl. ................................................ 349/141
(58) Field of Classification Search .............. 349/141
See application file for complete search history.

(56) References Cited

U.S. PATENT DOCUMENTS

| 6,795,151 | B2 | 9/2004 | Lee | |
| 7,602,460 | B2 * | 10/2009 | Choi et al. | 349/106 |
| 2005/0099569 | A1 | 5/2005 | Moon | |
| 2005/0140856 | A1 * | 6/2005 | Choi et al. | 349/110 |
| 2005/0200790 | A1 | 9/2005 | Konno et al. | |
| 2006/0001815 | A1 * | 1/2006 | Kim et al. | 349/141 |
| 2006/0028604 | A1 * | 2/2006 | Liu | 349/141 |
| 2006/0139556 | A1 * | 6/2006 | Ahn et al. | 349/153 |
| 2006/0290864 | A1 * | 12/2006 | Oh et al. | 349/141 |
| 2007/0103611 | A1 * | 5/2007 | Park et al. | 349/40 |
| 2007/0222907 | A1 * | 9/2007 | Onogi et al. | 349/42 |
| 2007/0242203 | A1 * | 10/2007 | Lee et al. | 349/141 |

FOREIGN PATENT DOCUMENTS

| TW | 591278 | 6/2004 |
| TW | 200535489 | 11/2005 |
| TW | I255384 | 5/2006 |
| TW | I261713 | 9/2006 |

OTHER PUBLICATIONS

Office Action, along with its English-language translation, issued Aug. 21, 2009 in corresponding Chinese Application No. 200810097576.9.

Taiwan Office Action (Application No. 097117675), dated May 4, 2012.

* cited by examiner

*Primary Examiner* — Mark Robinson
*Assistant Examiner* — Jerry Blevins
(74) *Attorney, Agent, or Firm* — Morgan, Lewis & Bockius LLP

(57) ABSTRACT

A liquid crystal display device includes a gate line and a data line crossing each other to define a pixel region, a thin film transistor positioned at the crossing of the gate line and the data line, a common line extending in parallel to the gate line, a common electrode connected to the common line and having common finger portions extending into the pixel region, and a pixel electrode connected to a drain electrode of the thin film transistor and having pixel finger portions extending into the pixel region and overlapping the common line.

18 Claims, 13 Drawing Sheets

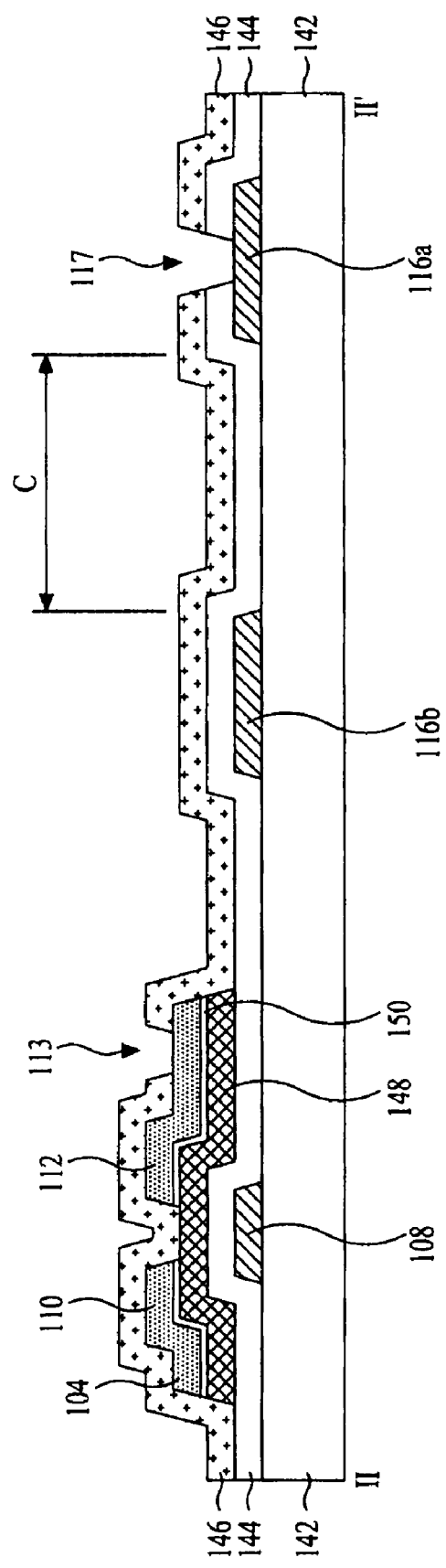

LIQUID CRYSTAL DISPLAY DEVICE AND FABRICATING METHOD THEREOF

This application claims the benefit of Korean Patent Application No. 10-2007-046694, filed on May 14, 2007, and Korean Patent Application No. 10-2007-074487, filed on Jul. 25, 2007, which are both hereby incorporated by reference in their entirety as if fully set forth herein.

BACKGROUND OF THE INVENTION

1. Field of the Invention

Embodiments of the invention relate to a display device, and more particularly to, a liquid crystal display ("LCD") device and fabricating method thereof. Although embodiments of the invention are suitable for a wide scope of applications, it is particularly suitable for improved transmittance in an LCD device.

2. Discussion of the Related Art

Liquid crystal displays ("LCDs") control electric fields applied to liquid crystal cells to modulate light incident to the liquid crystal cells, thereby displaying an image. LCDs are classified into either vertical electric field-type LCDs or horizontal electric field-type LCDs, depending upon the direction of an electric field that drives the liquid crystal material.

In a vertical electric field-type LCDs, when a voltage is applied to pixel electrodes and common electrodes opposing each other on upper and lower substrates, an electric field is applied across the liquid crystal material between the electrodes. Vertical electric field-type LCDs have the disadvantage of a narrow viewing angle.

In a horizontal electric field-type LCDs, when a voltage is applied to pixel electrodes and common electrodes arranged on the same substrate, an electric field is applied across the liquid crystal material between the electrodes. Horizontal electric field-type LCDs have the advantage of a wide viewing angle, as compared to vertical electric field-type LCDs.

Horizontal electric field-type LCDs include a thin transistor substrate joined to a color filter substrate such that the substrates face each other, spacers to maintain a cell gap between the two substrates and liquid crystal material within the cell gap. The thin film transistor substrate includes signal lines and thin film transistors to generate a horizontal electric field in each cell, and an alignment film is positioned over the signal lines and the thin film transistors for aligning the liquid crystal material. The color filter substrate includes color filters to render colors, a black matrix to prevent light leakage and an alignment film applied is positioned over the color filters and the black matrix for aligning the liquid crystal material.

FIG. 1 is a view illustrating a thin film transistor substrate of a horizontal electric field-type LCD according to the related art. As shown in FIG. 1, the related art LCD thin film transistor substrate includes: a gate lines 2 and data lines 4 crossing each other, to define pixel regions; thin film transistors 6 at each crossing of an associated one of the gate lines 2 and an associated one of the data lines 4; first common lines 16a and second common lines 16b each extending in parallel to the gate lines 2 in the pixel regions; common electrodes 18 each connected to the first common lines 16a while extending over the pixel region with finger portions 18b; and pixel electrodes 14, extending over the pixel region, that are individually connected to a drain electrode of an associated one of the thin film transistors 6 and alternately arranged with finger portions 18b of the common electrodes 18.

The first and second common lines 16a and 16b are formed at the same time as the gate lines 2 using the same non-transparent metal as the gate lines 2. The first and second common lines 16a and 16b are connected to the common electrodes 18 and supply a common voltage to the common electrodes 18.

The liquid crystal display shown in FIG. 1 further includes connecting lines 16c to connect the first non-transparent common lines 16a with the second non-transparent common lines 16b. The connecting lines 16c extending in parallel to the data lines 4 and are made of a non-transparent metal like the first and second common lines 16a and 16b to prevent light leakage of the pixel regions during driving of the liquid crystal display.

In response to a scan pulse of the gate line 2, the thin film transistor 6 applies a data signal from the data line 4 to the pixel electrode 14 in the pixel region. For this operation, the thin film transistor 6 includes a gate electrode 8 connected to the gate line 2, a source electrode 10 connected to the data line 4 and the drain electrode 12 connected to the pixel electrode 14. The thin film transistor 6 further includes an active layer (not shown) forming a channel between the source electrode 10 and the drain electrode 12 above the gate electrode 8, and ohmic contact layers (not shown) to allow ohmic connection to the active layer by the source electrode 10 and the drain electrode 12.

The common electrode 18 is connected to the first common line 16a through a contact hole 17, and includes a base portion 18a extending in parallel to the gate line 2 and a plurality of finger portions 18b extending from the base portion 18a into the pixel region. The common electrode 18 is made of a transparent metal.

The pixel electrode 14 includes a first pixel electrode 14a connected to the drain electrode 12 of the thin film transistor 6 though the contact hole 13 and extending in parallel to the gate line 2, and a plurality of second pixel electrodes 14b extending from the first pixel electrode 14a to the pixel region and being arranged alternately with the finger portions 18b of the common electrode 18. The pixel electrode 14 is made of the same transparent metal as the common electrode 18. The first pixel electrode 14a overlaps the second non-transparent common lines 16b with an insulating layer (not shown) to form a storage capacitor.

A horizontal electric field can be applied between the second pixel electrode 14b that receives a data signal through the thin film transistor 6 and the finger portion 18b of the common electrode 18 that receives a common voltage through the first common line 16a. This horizontal electric field leads to rotation of liquid crystal molecules that were in initially aligned in a horizontal direction in the pixel region due to dielectric anisotropy. Further, the transmittance of light transmitted through the pixel region is varied depending on the degree of rotation of the liquid crystal molecules such that a gray scale can be implemented. However, in related art LCDs, transmittance deterioration occurs at an end portion of the second pixel electrode 14b and at an end portion of the finger portion 18b of the common electrode 18, as shown in regions A and B of FIG. 1.

FIG. 2 is a view illustrating the phenomenon of transmittance deterioration occurring in region A when an electric field is applied. As shown in FIG. 2, the liquid crystal molecules 20 in the region A are driven not only by an electric field applied between the finger portion 18b of the common electrode 18 and the second pixel electrode 14b, but also by an electric field applied between the base portion 18a of the common electrode 18 and the second pixel electrode 14b. Meanwhile, polarizing plates with transmission axes crossing at right angels, to control light transmittance, are respectively mounted in upper and lower parts of the liquid crystal display.

During driving of the liquid crystal molecules 20, in the case of the regions A and B where the transmission axis of the polarizing plates do not correspond to the alignment of the liquid crystal molecules 20, light is not transmitted, as compared to the remaining regions, and therefore contrast and brightness degrades.

SUMMARY OF THE INVENTION

Accordingly, embodiments of the invention are directed to a liquid crystal display ("LCD") device and fabricating method thereof that substantially obviate one or more problems due to limitations and disadvantages of the related art.

An object of embodiments of the invention is to provide a liquid crystal display (LCD) panel capable of preventing deterioration in brightness at the ends of pixel electrodes and common electrodes while improving an aperture ratio and a fabricating method thereof.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of embodiments of the invention, as embodied and broadly described, a liquid crystal display device includes a gate line and a data line crossing each other to define a pixel region, a thin film transistor positioned at the crossing of the gate line and the data line, a common line extending in parallel to the gate line, a common electrode connected to the common line and having common finger portions extending into the pixel region, and a pixel electrode connected to a drain electrode of the thin film transistor and having pixel finger portions extending into the pixel region and overlapping the common line.

In another aspect, a liquid crystal display device includes a gate line and a data line crossing each other to define a pixel region, a thin film transistor positioned at the crossing of the gate line and the data line, first and second common lines on opposite sides of the pixel region and extending in parallel with the gate line, a common electrode connected to the first common line and having common finger portions extending into the pixel region and overlapping the second common line, and a pixel electrode connected to a drain electrode of the thin film transistor and having pixel finger portions extending into the pixel region.

In another aspect, a method of fabricating a liquid crystal display device includes: patterning a gate electrode, gate line and a common line on a substrate; patterning a gate insulating film, an active layer, ohmic contact layers, a source electrode and a drain electrode; patterning a passivation layer having a first contact hole to the common line and a second contact hole to the drain electrode; forming a common electrode connected to the common line through the first contact hole and having common finger portions; and forming a pixel electrode connected to the drain electrode through the second contact hole and having pixel finger portions overlapping the common line.

In yet another aspect, a liquid crystal display device includes a first gate line and a data line crossing each other to define a pixel region on a first substrate, a thin film transistor positioned at the crossing, a common electrode and a pixel electrode alternately arranged in the pixel region, and a common electrode overlapped by the pixel electrode with an insulating film interposed between the common electrode and the pixel electrode, wherein the pixel electrode has an extension portion overlapping a second gate line of an adjacent pixel region and an opening in the extension portion overlapping the second gate line.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention.

FIGS. 7a to 7d are views illustrating a method for fabricating a liquid crystal display device according to the second embodiment of the invention;

DETAILED DESCRIPTION OF THE PREFERRED EMBODIMENTS

Figure 1:
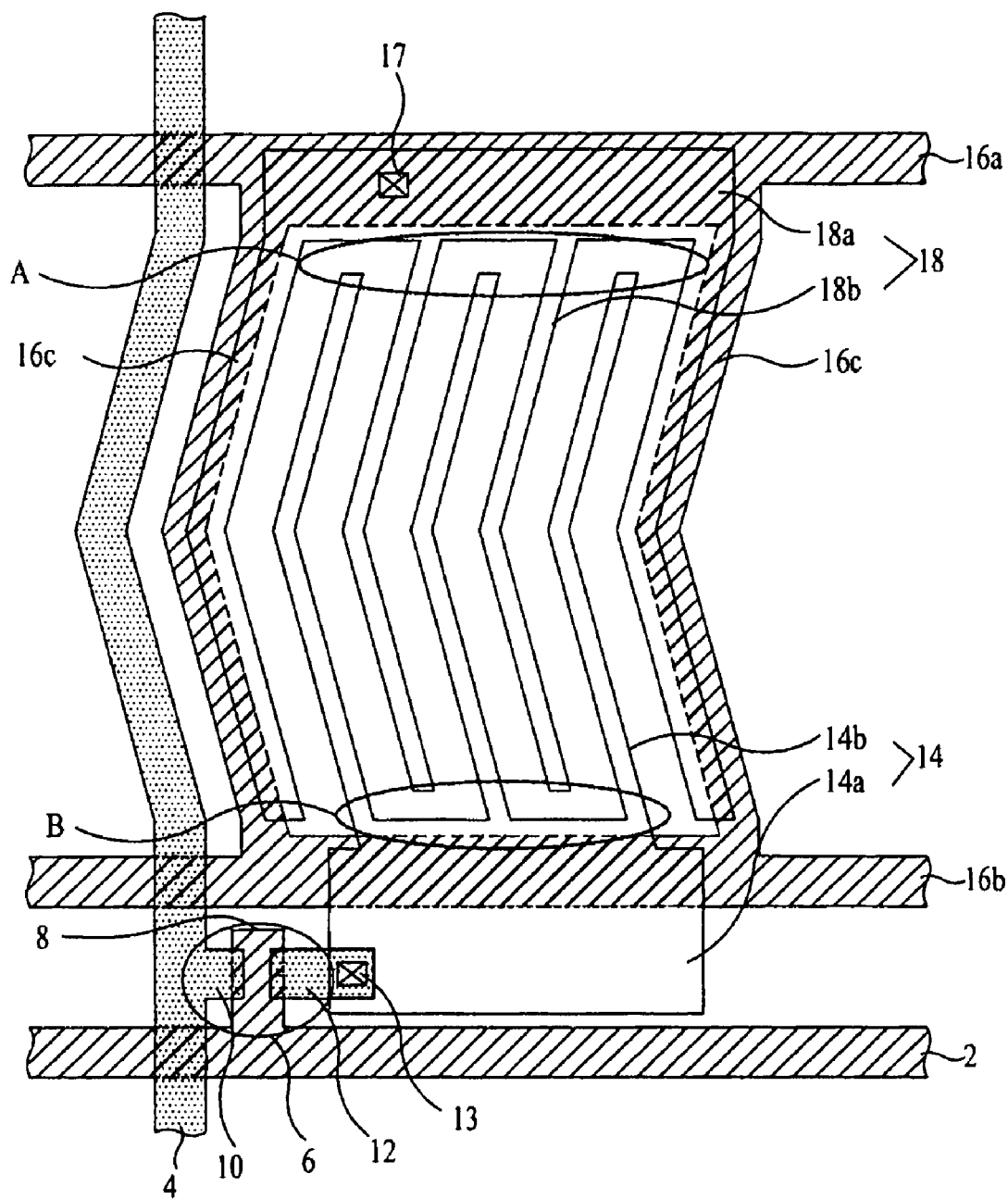
FIG. 1 is a view illustrating a related art liquid crystal display device.
Figure 2:
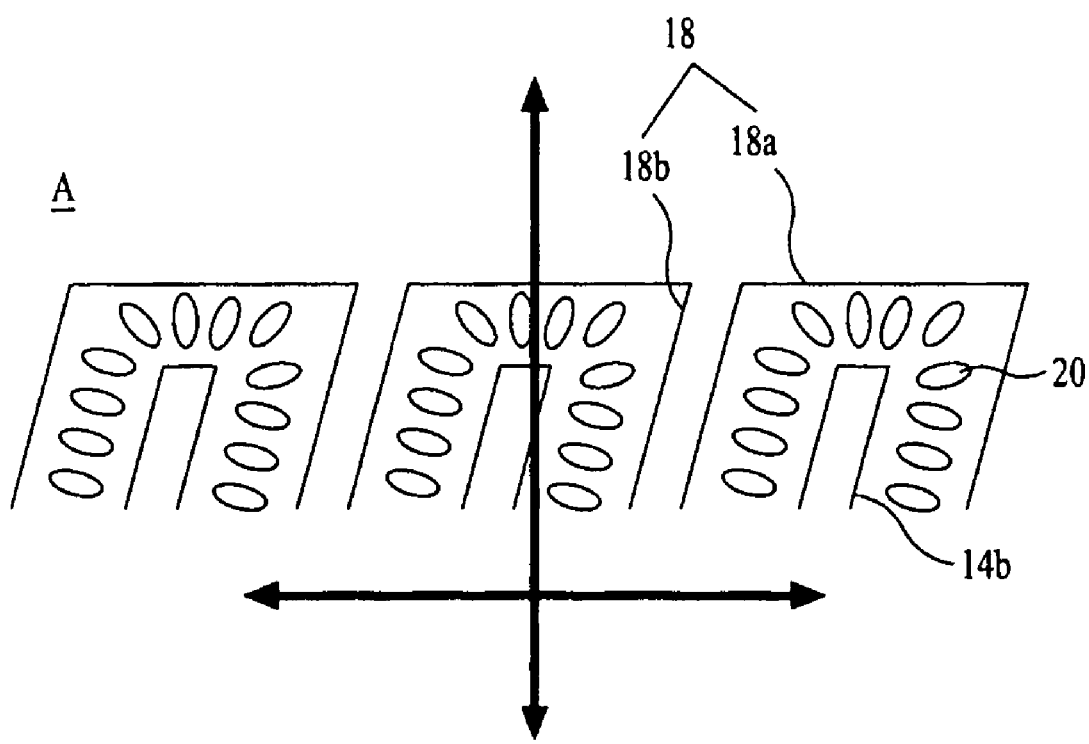
FIG. 2 is a view illustrating the region A of FIG. 1.

Reference will now be made in detail to the preferred embodiments of the invention, examples of which are illustrated in the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity. Like reference numerals in the drawings denote like elements.

Figure 3:
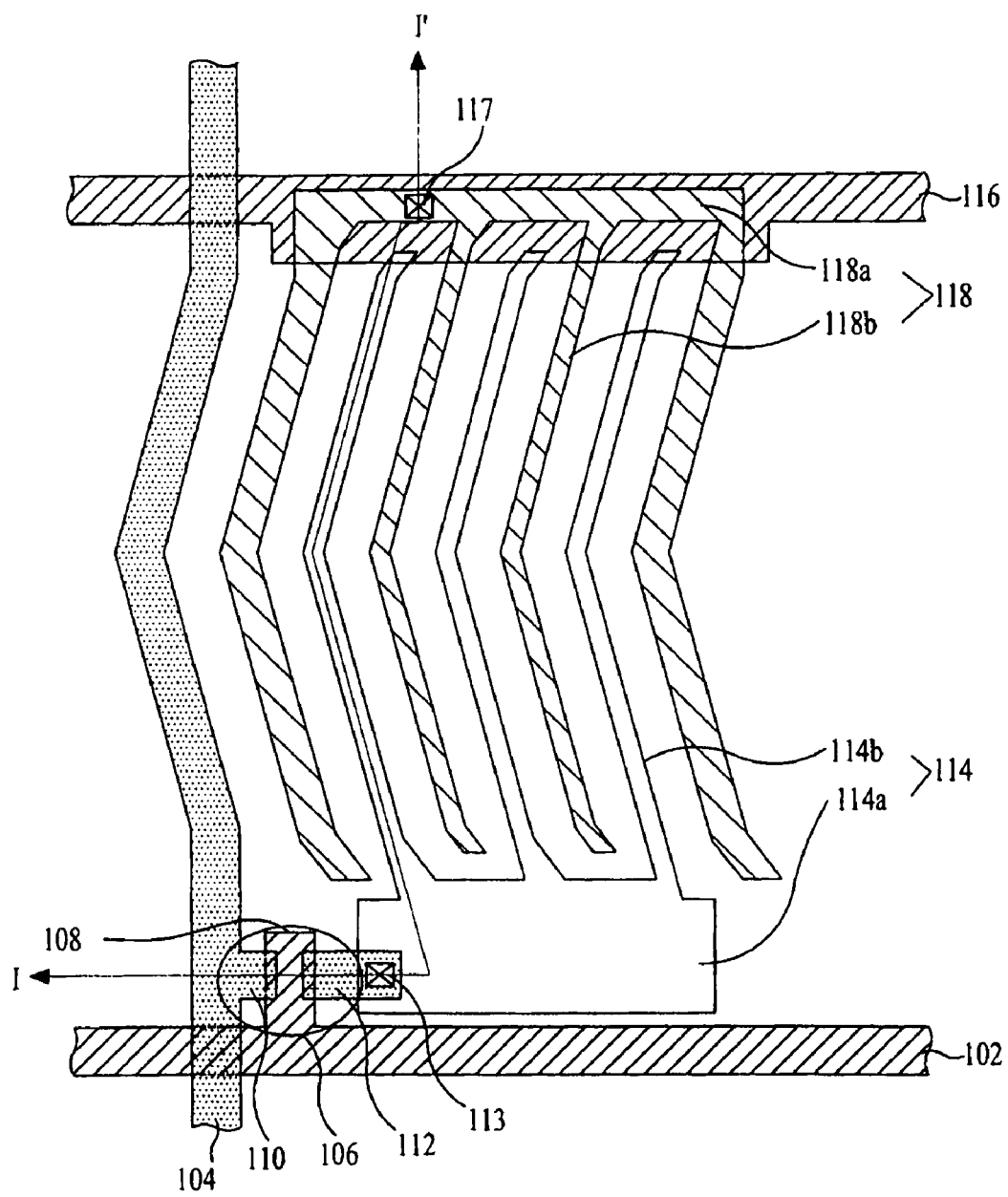
FIG. 3 is a view illustrating a liquid crystal display device according to a first embodiment of the invention.
Figure 4:
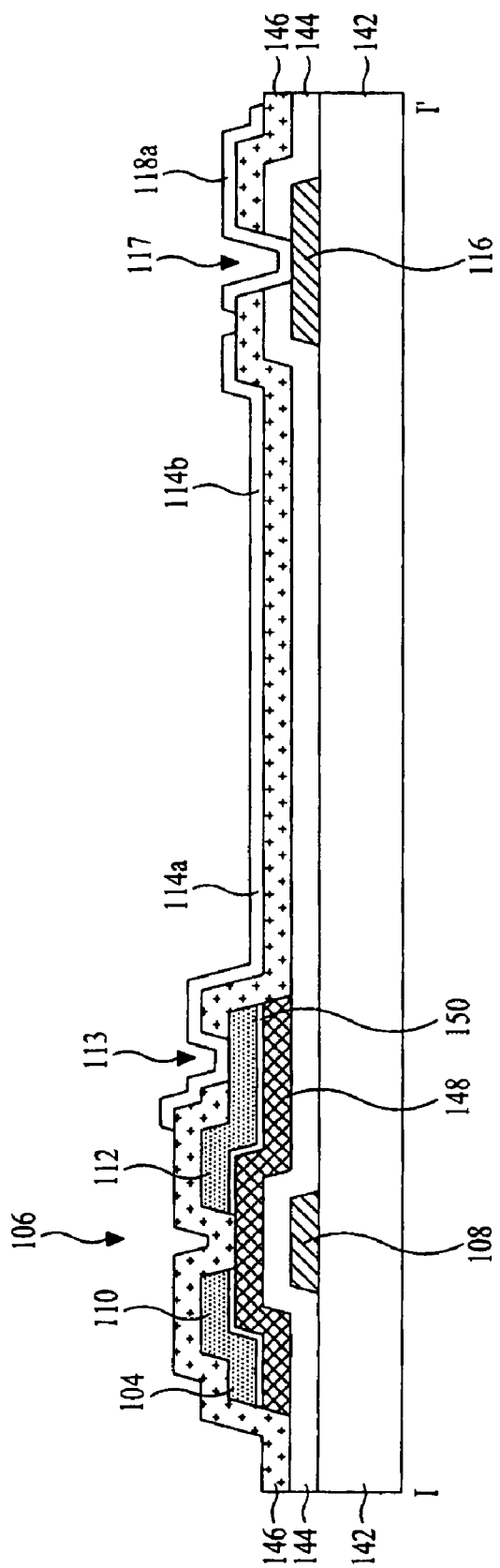
FIG. 4 is a cross-sectional view taken along the line I-I' of FIG. 3.

FIG. 3 is a view illustrating a thin film transistor substrate of a liquid crystal display device according to a first embodiment of the invention. FIG. 4 is a cross-sectional view taken along the line I-I' of FIG. 3. As shown in FIGS. 3 and 4, the LCD thin film transistor substrate according to the first embodiment includes: a gate line 102 and a data line 104 crossing each other to define a pixel region; a thin film transistor 106 positioned at the crossing of the gate line 102 and the data line 104; a non-transparent common line 116 extending in parallel to the gate line 102 and crossing the data line 104; a transparent common electrode 118 connected to the non-transparent common line 116 and having common finger portions 118b extending into the pixel region; and a pixel electrode 114 connected to a drain electrode of the thin film transistor 106 and having pixel finger portions 114b extending into the pixel region that alternate with the common finger portions 118b. The non-transparent common line 116 is formed at the same time as the gate line 102 using the same non-transparent metal as the gate line 102. The non-transparent common line 116 is connected to the transparent common electrode 118 to supply a common voltage to the transparent common electrode 118.

In response to a scan pulse of the gate line 102, the thin film transistor 106 applies a data signal through the data line 104 to the pixel electrode 114, thus allowing the data voltage to be charged onto the pixel electrode 114. For this operation, the thin film transistor 116 includes a gate electrode 108 connected to the gate line 102, a source electrode 110 connected to the data line 104, and a drain electrode 112 connected to the pixel electrode 114. In addition, the thin film transistor 106 includes an active layer 148 forming a channel between the source electrode 110 and the drain electrode 112 above the gate electrode 108, and ohmic contact layers 150 to allow ohmic contact to the active layer by the source electrode 110 and the drain electrode 112.

The transparent common electrode 118 is made of a transparent metal, and includes a base portion 118a and a plurality of common finger portions 118b. The base portion 118a is connected to the non-transparent common line 116 through a common contact hole 117 and parallels the gate line 102. The common finger portions 118b extend from the base portion 118a into the pixel region.

The pixel electrode 114 is made of the same transparent metal as the transparent common electrode 118. The pixel electrode 114 includes a transparent base pixel electrode 114a and a plurality of transparent pixel finger portions 114b. The transparent base pixel electrode 114a is connected through a pixel contact hole 113 to the drain electrode 112 of the thin film transistor 106 and parallels the gate line 102. The transparent pixel finger portions 114b are arranged alternately with the common finger portions 118b while extending from the transparent base pixel electrode 114a into the pixel region. Ends of the transparent pixel finger portions 114b overlap the non-transparent common line 116 such that region A of the related art is shifted so as to be positioned over the non-transparent common line 116. In the first embodiment of the invention, the common finger portions 118b can have canted ends. Further, the transparent pixel finger portions 114b can have canted ends. Furthermore, the transparent base pixel electrode 114a can include corresponding edges directly facing a same side of the canted ends of the common finger portions 118b. In yet in another alternative, the common base portion 118a can include corresponding edges directly facing a same side of the canted ends of the transparent pixel finger portion 114b.

Accordingly, a horizontal electric field is applied between one of the transparent pixel finger portions 114b that receives a data signal through the thin film transistor 106 and one of the common finger portions 118b of the transparent common electrode 118 that receives a common voltage through the non-transparent common line 116. This horizontal electric field causes rotation of liquid crystal molecules aligned in a horizontal direction in the pixel region due to dielectric anisotropy. Further, the transmittance of light transmitted to the pixel region is varied depending on the degree of rotation of the liquid crystal molecules to thereby express a gray scale.

In the pixel region of the liquid crystal display device according to a first embodiment of the invention, regions in which transparent pixel finger portions 114b of the transparent pixel electrode 114 are arranged alternately with the common finger portions 118b of the transparent common electrode 118 correspond to a display portion. On the other hand, regions in which there is the non-transparent common line 116 made of a non-transparent metal correspond to a non-display portion. That is, according to the LCD device of the first embodiment, ends of the transparent pixel finger portions 114b overlapping the non-transparent common line 116 are positioned in a non-display portion. Accordingly, in the LCD device according to the first embodiment of the invention, ends of the transparent pixel finger portions 114b where deterioration in light transmittance occurs in related art LCDs are positioned in the non-display portion, thereby improving light transmittance.

Figure 5:
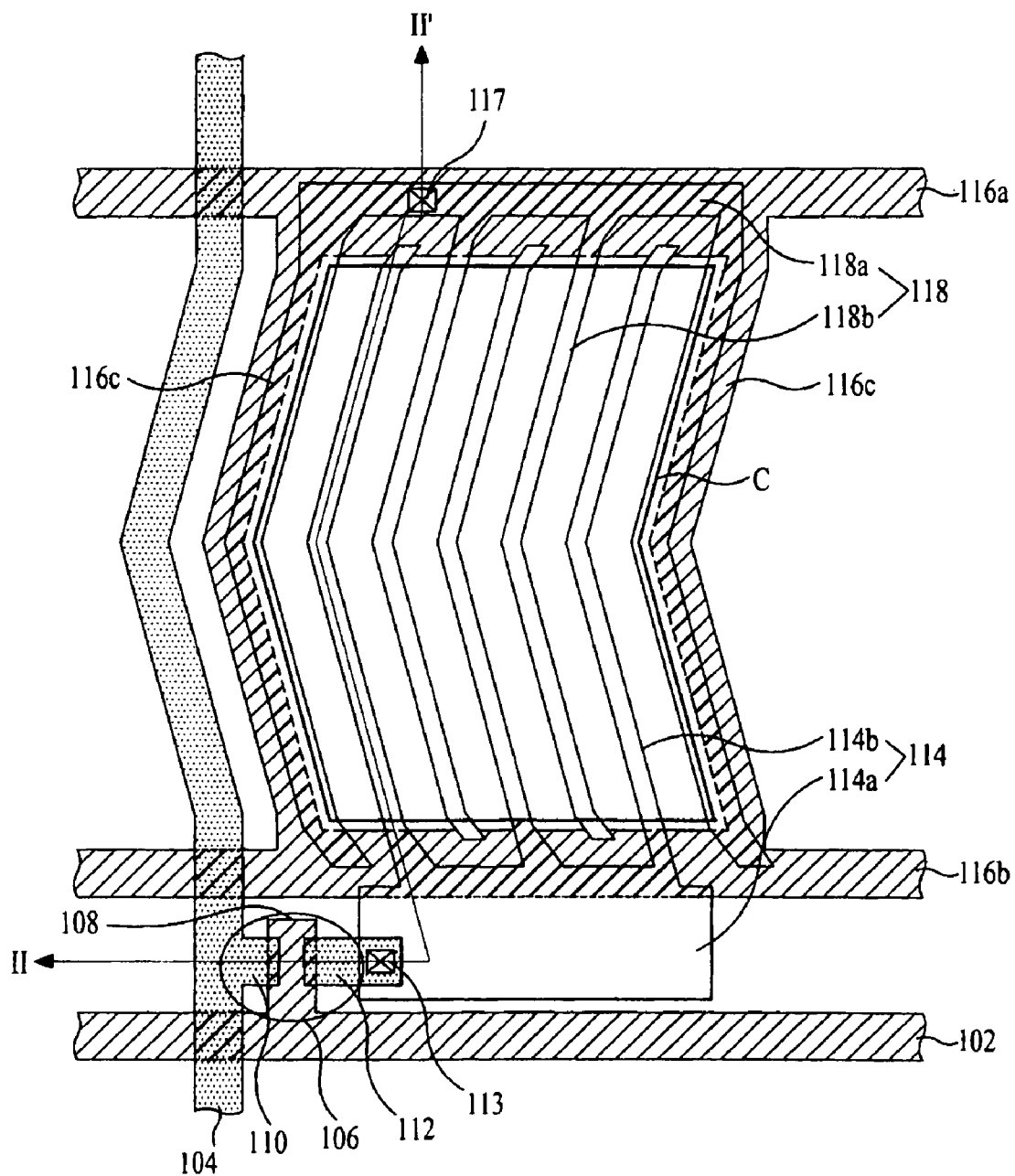
FIG. 5 is a view illustrating a liquid crystal display device according to a second embodiment of the invention.
Figure 6:
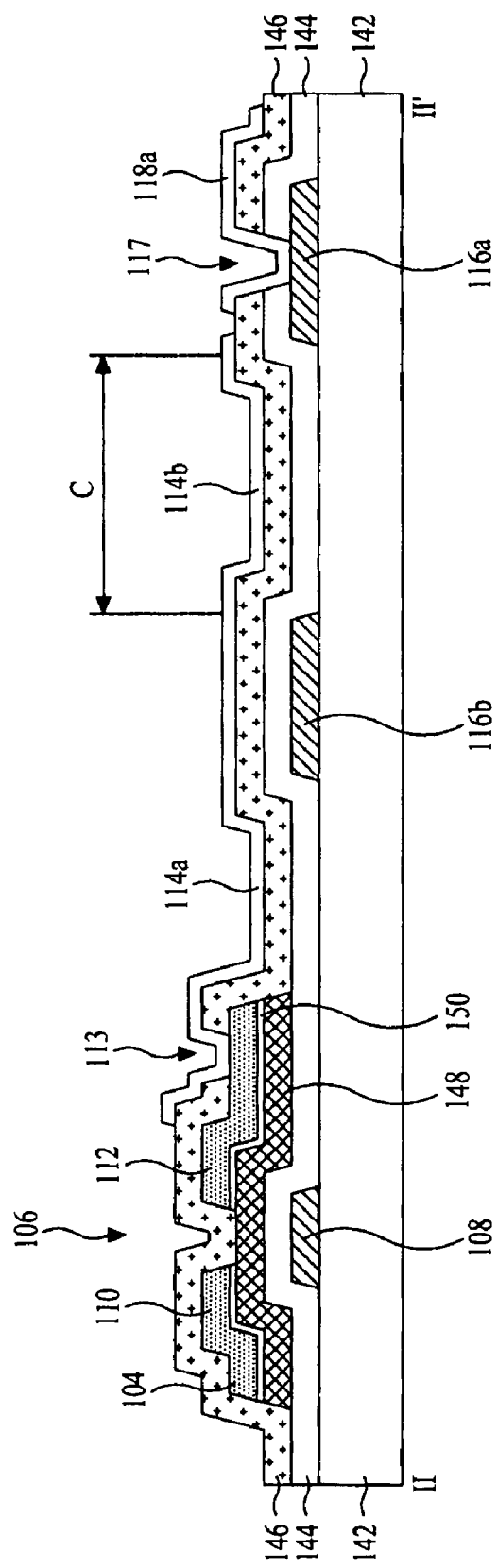
FIG. 6 is a cross-sectional view taken along the line II-II' of FIG. 5.

FIG. 5 is a view illustrating a thin film transistor substrate of a liquid crystal display device according to a second embodiment of the invention. FIG. 6 is a cross-sectional view taken along the line II-II' of FIG. 5. As shown in FIGS. 5 and 6, the LCD device thin film transistor substrate according to the second embodiment of the invention includes: a gate line 102 and a data line 104 crossing each other to define a pixel region; a thin film transistor 106 positioned at the crossing of the gate line 102 and the data line 104; a pair of parallel non-transparent common lines 116a and 116b on opposite sides of the pixel region and extending in parallel with the gate line 102; a transparent common electrode 118 connected to the non-transparent common line 116a and having common finger portions 118b extending into the pixel region; and a pixel electrode 114 connected to a drain electrode of the thin film transistor 106 and having pixel finger portions 114b extending into the pixel region that alternate with the common finger portions 118b. The non-transparent common line 116a and 116b are formed at the same time as the gate line 102 using the same non-transparent metal as the gate line 102. The non-transparent common line 116a is connected to the transparent common electrode 118 to supply a common voltage to the transparent common electrode 118.

According to the second embodiment of the invention, the LCD device thin film transistor substrate can also include connecting lines 116c, which are on both side of the pixel region, to connect the first non-transparent common line 116a with the second non-transparent common line 116b. The connecting lines 116c extends in parallel to the data line 104 and are made of the same non-transparent metal as the first and second non-transparent common lines 116a and 116b to prevent light leakage of the pixel region during driving of the liquid crystal display device.

In response to a scan pulse of the gate line 102, the thin film transistor 106 applies a data signal through the data line 104 to the pixel electrode 114. For this operation, the thin film transistor 106 includes a gate electrode 108 connected to the gate line 102, a source electrode 110 connected to the data line 104 and a drain electrode 112 connected to the pixel electrode 114. In addition, the thin film transistor 106 includes an active layer 148 forming a channel between the source electrode 110 and the drain electrode 112 above the gate electrode 108, and ohmic contact layers 150 to allow ohmic connection of the active layer 148 to the source electrode 110 and the drain electrode 112.

The transparent common electrode 118 is made of a transparent metal, and includes a base portion 118a and a plurality of common finger portions 118b. The base portion 118a is connected to the first non-transparent common line 116a through a common contact hole 117 and parallels the gate line 102. The common finger portions 118b extend from the base portion 118a into the pixel region. An end of each common finger portions 118b overlap the second non-transparent common line 116b such that a gate insulating film 144 and a passivation film 146 are interposed between the finger portion 118b and the second non-transparent common line 116b.

The transparent pixel electrode 114 is made of the same transparent metal as the common electrode 118 and includes a transparent base pixel electrode 114a and a plurality of transparent pixel finger portions 114b. The transparent base pixel electrode 114a is connected to the drain electrode 112 of the thin film transistor 106 through a pixel contact hole 113 and extends in parallel to the gate line 102. The transparent pixel finger portions 114b are arranged alternately with the common finger portions 118b, while extending from the transparent base pixel electrode 114a into the pixel region. Ends of the transparent pixel finger portions 114b overlap the first non-transparent common line 116a such that region A of the related art is shifted so as to be positioned over the first non-transparent common line 116a. Further, ends of the common finger portions 118b overlap the second non-transparent common line 116b such that region B of the related art is shifted so as to be positioned over the second non-transparent common line 116b.

In the second embodiment, the common finger portions 118b can have canted ends. Further, the transparent pixel finger portions 114b can have canted ends. Furthermore, the transparent base pixel electrode 114a can include corresponding edges directly facing a same side of the canted ends of the common finger portions 118b. In yet in another alternative, the common base portion 118a can include corresponding edges directly facing a same side of the canted ends of the transparent pixel finger portion 114b.

A horizontal electric field can be applied between the pixel finger portions 114b of the pixel electrode 114 that receives a data signal through the thin film transistor 106 and the common finger portions 118b of the common electrode 118 that receives a common voltage through the first non-transparent common line 116a. This horizontal electric field causes liquid crystal molecules aligned in a horizontal direction in the pixel region to rotate due to dielectric anisotropy. Further, the transmittance of light transmitted to the pixel region is varied, depending on the degree of rotation of the liquid crystal molecules so as to implement a gray scale.

In the pixel region of the liquid crystal display according to the second embodiment of the invention, regions where the pixel finger portions 114b made of a transparent metal are arranged alternately with the common finger portions 118b of the transparent common electrode 118 correspond to a display portion C. Regions where there are the first and second non-transparent common lines 116a and 116b and the connecting line 116c made of a non-transparent metal correspond to a non-display portion. That is, in the LCD device of the second embodiment, the ends of the pixel finger portions 114b of the pixel electrode 114 overlapping the first non-transparent common line 116a, and the ends of the common finger portion 118b of the transparent common electrode 118 overlapping the first non-transparent common line 116b are positioned in a non-display portion. Thus, in the LCD device according to the second embodiment of the invention, the regions where deterioration in light transmittance occurs in the related art LCDs are positioned in the non-display portion, thereby improving light transmittance.

Hereinafter, a method for fabricating the liquid crystal display device according to embodiments of the invention will be described. FIGS. 7a to 7d are sectional-views illustrating a process for fabricating the thin film transistor substrate shown in FIGS. 5 and 6. Referring to FIGS. 6 and 7a to 7d, a method for fabricating a liquid crystal display device according to the second embodiment of the invention will be described hereinafter. With reference to the drawings, the fabrication method is illustrated as a 4-mask process but the LCD device according to embodiments of the invention is applicable regardless of the number of masks used in the masking process.

Figure 7A:
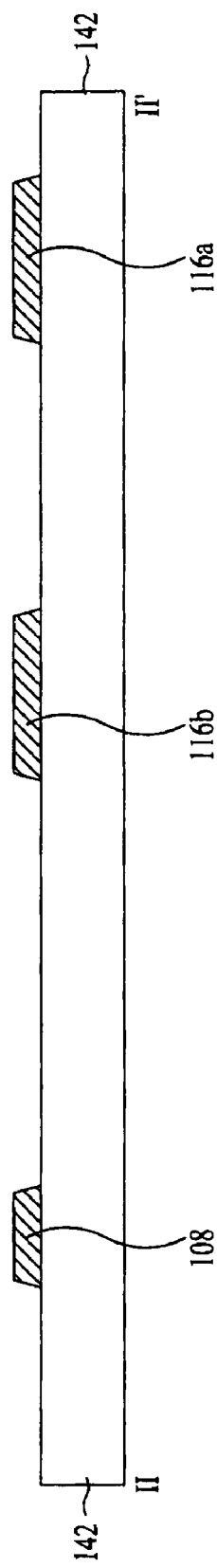

As shown in FIG. 7a, a non-transparent gate metal pattern including a gate line 102, a gate electrode 108 and first and second non-transparent common lines 116a and 116b are formed on a substrate 142 using a first mask process. More specifically, a non-transparent gate metal layer is formed on the substrate 142 by deposition, such as sputtering. Subsequently, the non-transparent gate metal layer is patterned in accordance with photolithographic and etching processes using the first mask to form a non-transparent gate metal pattern, including a gate line 102, a gate electrode 108, and first and second non-transparent common lines 116a and 116b. At this time, connecting lines 116c can be further formed, which connects the first non-transparent common line 116a to the second non-transparent common line 116b. The gate metal layer can be a single layer or double layers made of a metal, such as Al, Mo or Cr.

Figure 7B:
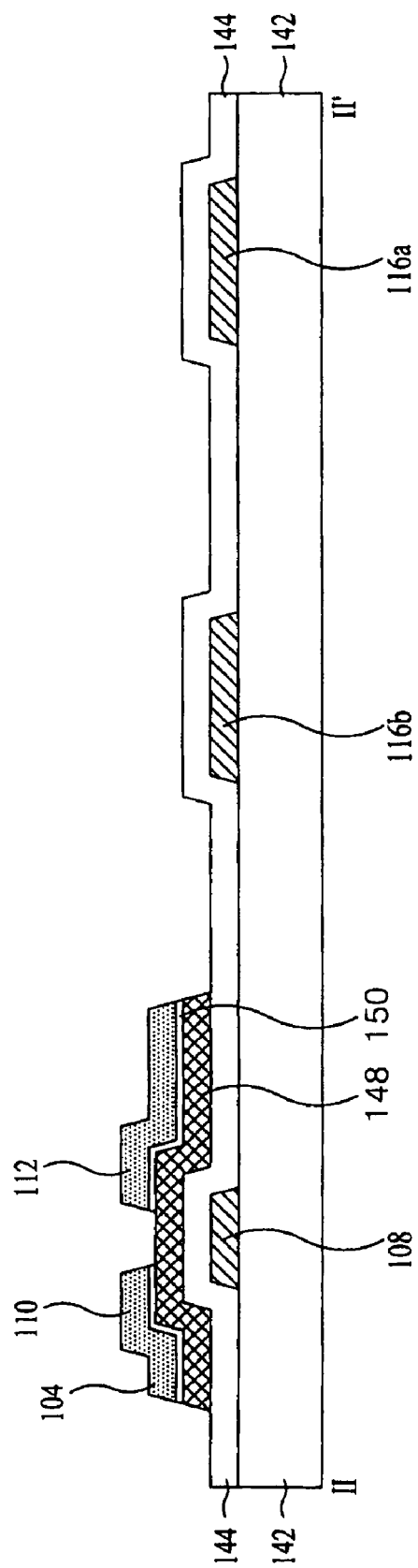

As shown in FIG. 7b, a gate insulating film 144 is applied over the entire surface of the substrate 142 provided with the non-transparent metal pattern. A semiconductor pattern, including an active layer 148 and ohmic contact layers 150, and a source/drain metal pattern, including a source electrode 110 and a drain electrode 112, are formed on the gate insulating film 144 using a second mask process. More specifically, a gate insulating film 144, an amorphous silicon layer, an n+ amorphous silicon layer and a source/drain metal layer are sequentially formed by deposition, such as PECVD or sputtering, on the substrate 142 provided with the non-transparent gate metal pattern. A material for the gate insulating film 144 used herein is an inorganic insulator, such as $SiO_x$, $SiN_x$. The source/drain metal layer can be a single layer or double layers made of a metal, such as Al, Mo or Cr. Then, a photoresist pattern with a step is formed on the source/drain metal layer through a photolithographic process using a second mask. The source/drain metal layer is patterned through an etching process using the photoresist pattern with a step, to form a source/drain metal pattern including a data line 104, a source electrode 110 and a drain electrode 112 formed integrally with the source electrode 110. The n+ amorphous silicon layer and the amorphous silicon layer are patterned at the same time through a dry etching process using the same photoresist pattern to form an ohmic contact layer 150 and an active layer 148. Subsequently, the photoresist pattern is subjected to ashing and the exposed source/drain metal pattern is etched together with an ohmic contact layer 150 to separate the source electrode 110 from the drain electrode 112, and the resulting structure is stripped to remove the photoresist pattern left on the source/drain metal pattern.

As shown in FIG. 7c, a passivation film 146 provided with a pixel contact hole 113 and a common contact hole 117 is formed on the gate insulating film 144 provided with the source/drain metal pattern using a third mask process. More specifically, a passivation film 146 is formed by deposition, such as PECVD, over the entire surface of the gate insulating film 144 provided with the source/drain metal pattern. Subsequently, the passivation film 146 is patterned in accordance with photolithographic and etching processes using a third mask to form a pixel contact hole 113 and a common contact hole 117. The pixel contact hole 113 passes through the passivation film 146 such that the drain electrode 112 is exposed to the outside, and the common contact hole 117 passes through the passivation film 146 and the gate insulating film 144 such that the first non-transparent common line 116a is exposed to the outside. A material for the passivation film 146 used herein can be the same inorganic insulator as the gate insulating film 144, such as an acrylic-based organic compound having a low dielectric constant or an organic insulator like BCB or PFCB.

Figure 7D:
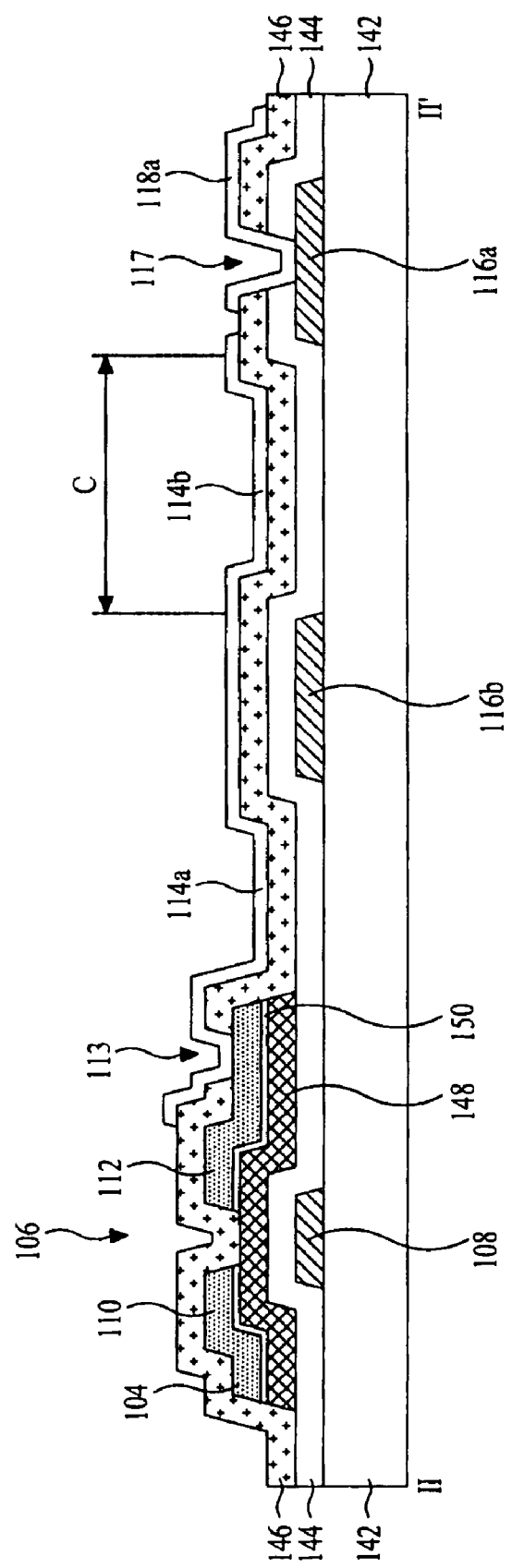

As shown in FIG. 7d, a transparent conductive pattern provided with a transparent common electrode 118 and a transparent pixel electrode 114 are formed on the passivation film 146. More specifically, a transparent conductive film is applied to the upper surface of the passivation film 146 by deposition, such as sputtering. Subsequently, the transparent conductive film is patterned in accordance with photolithographic and etching processes using a fourth mask to form a transparent conductive pattern provided with a transparent common electrode 118 and a transparent pixel electrode 114. A base portion 118a of the transparent common electrode 118 is connected to the first non-transparent common line 116a exposed through the common contact hole 117. Further, the first pixel electrode 114a of the transparent pixel electrode 114 is connected to the drain electrode 112 exposed through the pixel contact hole 113. An end of the finger portion 118b of the transparent common electrode 118 overlaps the second non-transparent common line 116b. An end of the second pixel electrode 114b of the transparent pixel electrode 114 overlaps the first non-transparent common line 116a. The transparent conductive film can be made of a material, such as indium tin oxide (ITO).

The thin film transistor substrate thus produced is joined with a color filter substrate provided with color filters in a black matrix and an alignment layer to form a liquid crystal display panel of the liquid crystal display device according to the embodiments of the invention.

In the liquid crystal display device and the fabrication method according to preferred embodiments of the invention, the end portions of the pixel electrodes and the common electrodes, causing deterioration in light transmittance, are positioned at a non-display portion, while overlapping with the non-transparent common lines, thereby improving light transmittance. However, such a liquid crystal display device may have a light leakage defect at the boundary between one pixel and a pixel adjacent thereto where the pixel electrode arranged in the pixel extends to the gate line of the adjacent pixel.

Such a liquid crystal display will be illustrated in more detail.

Figure 8:
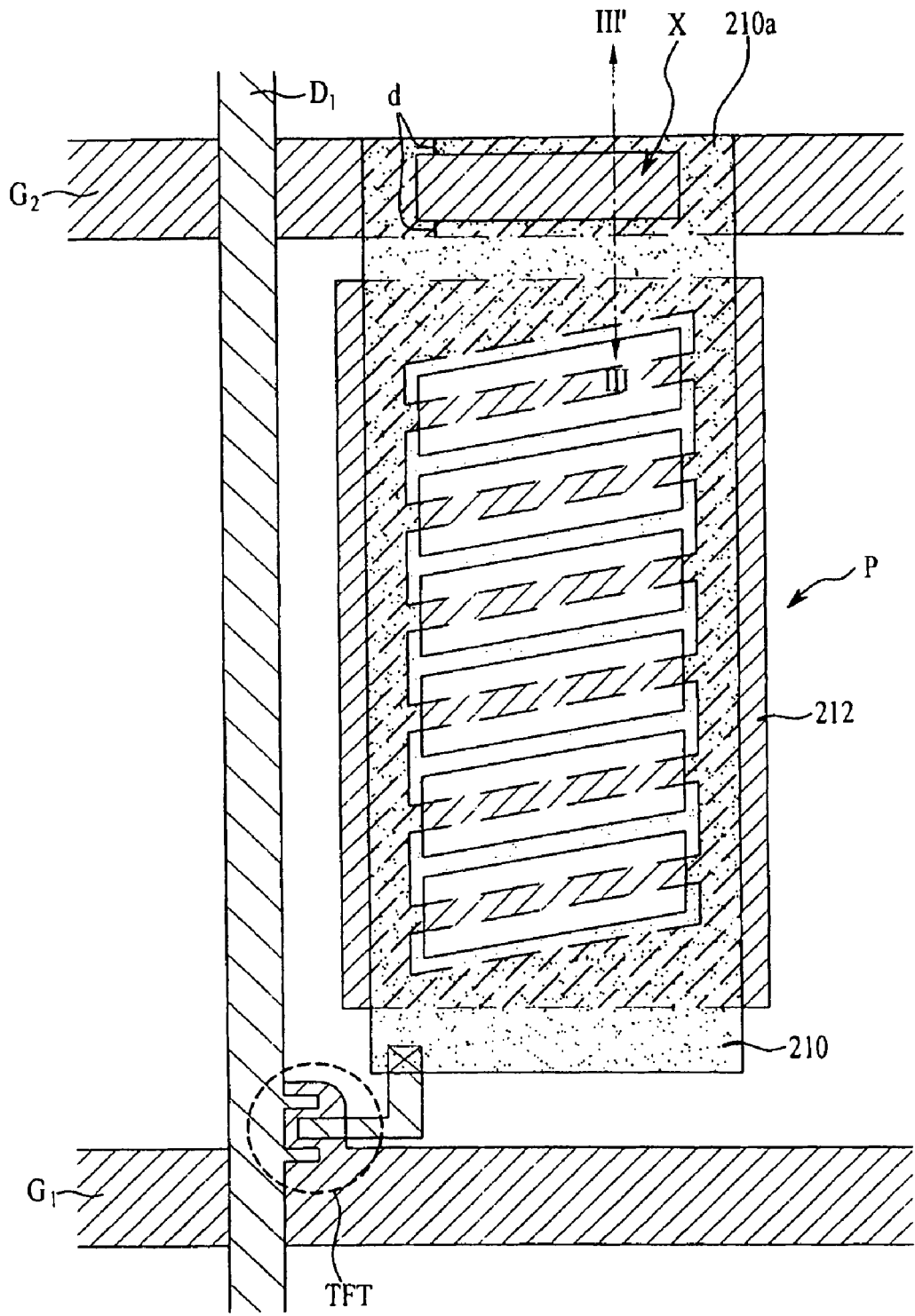
FIG. 8 is a view illustrating a pixel structure of an in-plane liquid crystal display according to a third embodiment of the invention.

FIG. 8 is a view illustrating a pixel structure of an in-plane liquid crystal display device according to a third embodiment of the invention. As shown in FIG. 8, a gate line G1 and a data line D1 cross each other to define a pixel region P, and a thin film transistor, a switching device, is positioned at a crossing of the gate line G1 and the data line D1. In addition, a common electrode 212 and a pixel electrode 210 are alternately arranged portions in the pixel region P such that they are spaced apart from each other at a predetermined distance. The common electrode 212 is overlapped by the pixel electrode 210 such that an insulating film is interposed between the common electrode 212 and the pixel electrode 210.

In the third embodiment of the invention, an extension portion 210a is arranged at an end of the pixel electrode 210 in the pixel region P such that the extension part 210a overlaps a gate line G2 of an adjacent pixel region. The term "an adjacent pixel region" used herein refers to a pixel region defined by the data line D1, which is arranged in the pixel region P defined by the gate line G1 and the data line D1, and a previous gate line G2 crossing the data line D1.

The space between the gate line G2 of the adjacent pixel region and the common electrode 212 arranged in the pixel region P is covered with the extension portion 210a of the pixel electrode 210. Further, the extension portion 210a overlaps the gate line G2 of the adjacent pixel region with insulation therebetween. The extension portion 210a overlapping the gate line G2 of the adjacent pixel region has an opening X. The opening X functions to control the level of a capacitance generated by the overlap of the extension portion 210a and the gate line G2 of the adjacent pixel region.

While taking into consideration the fabrication margin, the overlap of the extension portion 210a and the gate line G2 of the adjacent pixel region is adjusted to a width d at each of upper and lower regions based on the opening X. Although the pixel electrode 210 moves upward and downward due to errors occurring in the fabrication process, the region where the extension portion 210a overlaps the adjacent gate line G2 can be maintained constantly. That is, the capacitance generated in the space between the extension portion 210a and the gate line G2 of the adjacent pixel region can be maintained constantly.

Figure 9:
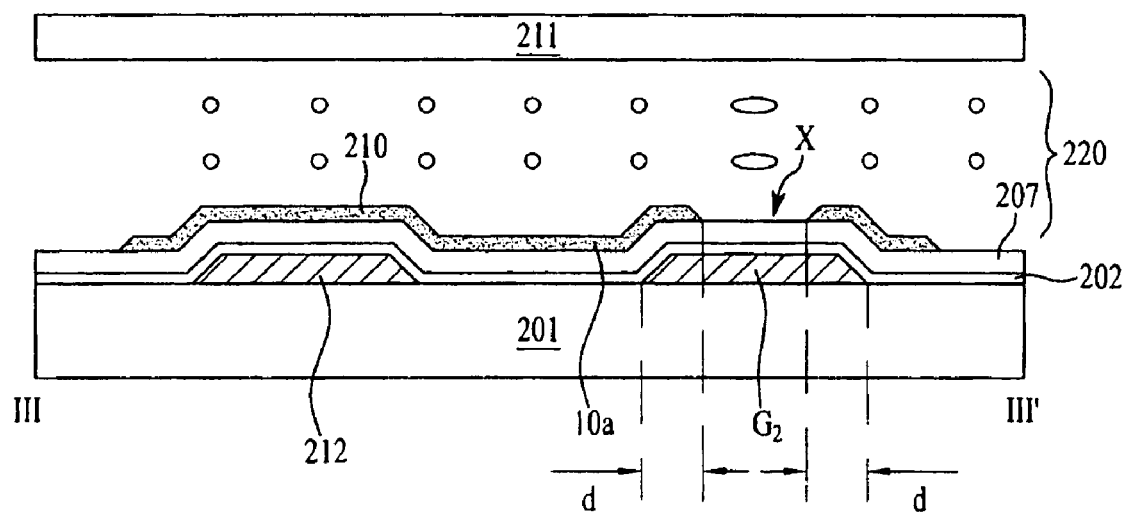
FIG. 9 is a cross-sectional view taken along the line III-III' of FIG. 8.

FIG. 9 is a cross-sectional view taken along the line III-III' of FIG. 8. As shown in FIG. 9, a upper substrate has a substructure in which a gate line G2 and a common electrode 212 are arranged in an adjacent pixel region and a pixel region on a glass substrate 201, respectively, and a gate insulating film 202 and a passivation film 207 are arranged over the glass substrate 210 provided with the gate line G2 and the common electrode 212.

A pixel electrode 210 is arranged on the passivation film 207, and the extension portion 210a formed integrally with the pixel electrode 210 is arranged in regions between the gate line G2 arranged in the adjacent pixel region and the common electrode 212 above the gate line G2. The extension portion 210a arranged on the passivation film 207 above the gate line G2 has an opening X, and the extension portion 210a overlapping the gate line G2 in the adjacent pixel region has an overlap area with a width d at both sides of the gate line G2. Such an overlap area prevents variation in capacitance resulting from errors occurring in the fabrication process.

Since the extension portion 210a of the pixel electrode 210 is arranged between the gate line G2 in the adjacent pixel region and the common electrode 212, liquid crystal molecules of a liquid crystal layer 220 do not rotate due to an electric field generated across the gate line G2 and the common electrode 210.

In the related art, liquid crystals are rotated by an electric field generated between the gate line G2 in the adjacent pixel region and the common electrode 212. For this reason, black matrixes are designed to extend to the gate line in the adjacent pixel to prevent the light leakage resulting from the incorrect rotation of liquid crystal molecules. On the other hand, the pixel structure according to embodiments of the invention eliminates the necessity of extending the black matrixes.

The reason is because the electric field generated between the gate line G2 in the adjacent pixel region and the common electrode 212 is not applied to the liquid crystal layer 220 due to the extension portion 210a. In addition, since the gate line is made of a non-transparent metal, it is unnecessary to form black matrixes not only in regions between the common electrode 212 in the pixel region and the gate line G2 in the adjacent pixel region, but also in regions corresponding to the gate lines in respective pixel regions on the upper substrate 211.

In the pixel structure of embodiments of the invention, there are black matrixes in only predetermined portions of the upper substrate corresponding to the data lines and thin film transistors of the lower substrate, and there is no black matrix in portions provided by the gate lines of the pixel region and predetermined portions of the upper substrate 211 corresponding to portions provided between the gate lines and the common electrodes.

As shown in FIGS. 8 and 9, a gate low voltage of −5V is applied to the gate line G2 arranged in an adjacent pixel region, before a signal is input in a pixel region (represented by the reference numeral "P" in FIG. 8). At this time, since a constant voltage of 6V is applied to the common electrode 212 in the pixel region P, an electric field is generated between the pixel electrode 212 and the gate line G2, thus causing liquid crystals to rotate. The extension portion 210a of the pixel electrode 210 prevents the electric field, generated between the common electrode 210 and the gate line G2 in the adjacent pixel region from being applied to a liquid crystal region 220 such that the liquid crystal molecules do not rotate. As a result, the light leakage defect does not occur. Further, a capacitance where the extension portion 210a of the pixel electrode 210 overlaps the gate line G2 in an adjacent pixel is controlled by controlling the area of an opening X provided in the extension portion 210a to thereby ensure a desired capacitance.

Figure 10:
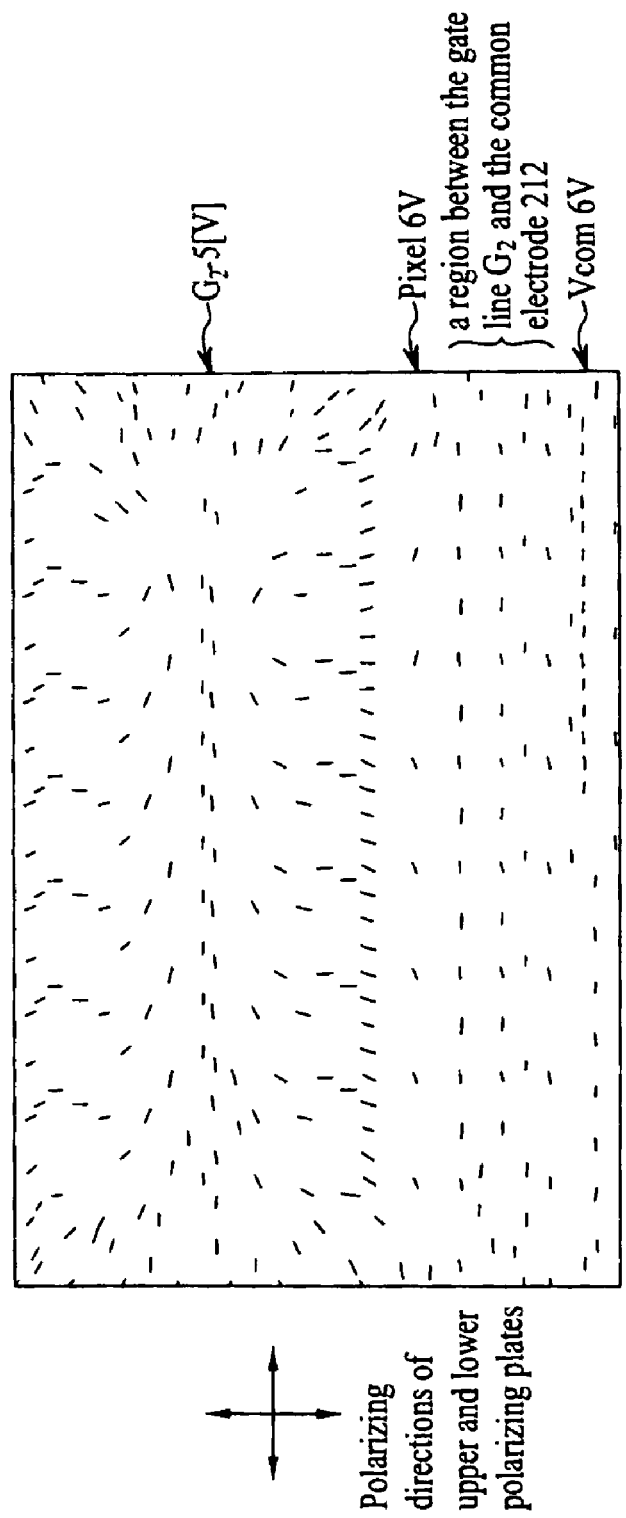
FIG. 10 is a view illustrating the rotation direction of liquid crystals according to an electric field in a pixel region of a liquid crystal display device according to a third embodiment of the invention.

FIG. 10 is a view illustrating the rotation direction of liquid crystals according to an electric field in a pixel region of the liquid crystal display according to a third embodiment of the invention. As shown in FIG. 10, rotation behavior of liquid crystal molecules according to an electric field direction is simulated when upper and lower polarizing plates are mounted on upper and lower substrates such that polarizing directions of the polarizing plates are perpendicular to each other, a voltage of −5V is applied to an adjacent gate line, and a voltage of 6V is applied to a pixel electrode and a common electrode, respectively. As can be seen from FIG. 10, liquid crystal molecules maintain an initial alignment state provided by an alignment film between the gate line in the adjacent pixel region and the common electrode in the pixel region such that no light leakage occurs.

As shown in FIG. 8, since the extension portion 210a of the pixel electrode 210 is over both the gate line G2 in the adjacent pixel region and the common electrode 212 in the pixel region, an electric field generated between the gate line G2 and the common electrode 210 is not applied to liquid crystal layer 220. Thus, the LCD device according to the third embodiment of the invention advantageously increases an aperture ratio in a pixel region while eliminating the necessity of the related art forming of a black matrix to extend into the space between the gate line and the common electrode of the adjacent pixel region.

It will be apparent to those skilled in the art that various modifications and variations can be made in embodiments of the invention without departing from the spirit or scope of the invention. Thus, it is intended that embodiments of the invention cover the modifications and variations of this invention provided they come within the scope of the appeneded claims and their equivalents.

What is claimed is:

1. A liquid crystal display device, comprising:
    a gate line and a data line crossing each other to define a pixel region;
    a thin film transistor positioned at the crossing of the gate line and the data line;
    a common line extending in parallel to the gate line;
    a common electrode connected to the common line and comprising common finger portions extending into the pixel region; and
    a pixel electrode connected to a drain electrode of the thin film transistor and comprising a transparent base pixel electrode and pixel finger portions extending into the pixel region,
    wherein the pixel finger portions have a plurality of fingers each comprising first and second ends,
    wherein the first ends of the plurality of pixel fingers are connected to the transparent base pixel electrode,
    wherein the second ends of the pixel fingers overlap with the common line, and
    wherein the pixel finger portions and the common finger portions are transparent while the common line is non-transparent.

2. The liquid crystal display device of claim 1, wherein the pixel finger portions alternate with the common finger portions.

3. The liquid crystal display device of claim 1, wherein each of the pixel finger portions has canted ends.

4. The liquid crystal display device of claim 1, wherein each of the common finger portions has canted ends.

5. A liquid crystal display device, comprising:
    a gate line and a data line crossing each other to define a pixel region;
    a thin film transistor positioned at the crossing of the gate line and the data line;
    first and second common lines on opposite sides of the pixel region and extending in parallel with the gate line;
    a common electrode connected to the first common line and comprising a common base portion and common finger portions extending into the pixel region, the common finger portions comprising a plurality of common fingers each having first and second ends, the first ends of the plurality of common fingers being connected to the common base portion, the second ends of the common fingers overlapping with the second common line; and
    a pixel electrode connected to a drain electrode of the thin film transistor and comprising pixel finger portions extending into the pixel region,
    wherein the pixel finger portions and the common finger portions are transparent while the first and second common lines are non-transparent.

6. The liquid crystal display device of claim 5, wherein:
    the pixel finger portions have a plurality of fingers each comprising first and second ends;
    the first ends of the plurality of pixel fingers are connected to the transparent base pixel electrode; and
    the second ends of the pixel fingers overlap the first common line.

7. The liquid crystal display device of claim 5, wherein each of the pixel finger portions has canted ends.

8. The liquid crystal display device of claim 5, wherein each of the common finger portions has canted ends.

9. The liquid crystal display device of claim 5, further comprising first and second connecting lines on other opposite sides of the pixel region in which both of the first and second connecting lines are connected to the first and second common lines.

10. The liquid crystal display device of claim 9, further comprising third and fourth common lines.

11. A method of fabricating a liquid crystal display device, comprising:
    patterning a gate electrode, gate line, and a common line on a substrate;
    patterning a gate insulating film, an active layer, ohmic contact layers, a source electrode, and a drain electrode;

patterning a passivation layer comprising a first contact hole to the common line and a second contact hole to the drain electrode;

forming a common electrode connected to the common line through the first contact hole and comprising a common base portion and common finger portions; and forming a pixel electrode connected to the drain electrode through the second contact hole and comprising a transparent base pixel electrode and pixel finger portions, wherein the pixel finger portions have a plurality of fingers each comprising first and second ends, wherein the first ends of the plurality of pixel fingers are connected to the transparent base pixel electrode, wherein the second ends of pixel fingers overlap with the common line, and wherein the pixel finger portions and the common finger portions are transparent while the common line is non-transparent.

12. The method of fabricating a liquid crystal display device according to claim 11, wherein the patterning a gate electrode, gate line, and a common line on a substrate includes forming first and second common lines extending in parallel with the gate line.

13. The method of fabricating a liquid crystal display device according to claim 12, wherein the forming first and second common lines extending in parallel with the gate line includes forming first and second connecting lines that are connected to the first and second common lines.

14. The method of fabricating a liquid crystal display device according to claim 12, wherein:

the forming a common electrode includes forming a plurality of common fingers each having first and second ends, the first ends of the plurality of common fingers connecting to the common base portion, and the second ends of the common fingers to overlap the second common line; and the forming a pixel electrode includes forming the second ends of pixel fingers to overlap the first common line.

15. The method of fabricating a liquid crystal display device according to claim 11, wherein the forming a common electrode includes forming common finger portions with canted ends.

16. The method of fabricating a liquid crystal display device according to claim 11, wherein the forming a pixel electrode includes forming pixel finger portions with canted ends.

17. A liquid crystal display device, comprising:
a first gate line and a data line crossing each other to define a pixel region on a first substrate;
a thin film transistor positioned at the crossing; and
a common electrode having a plurality of first slits and a pixel electrode having a plurality of second slits alternately arranged in the pixel region,
wherein the common electrode is overlapped by the pixel electrode with an insulating film interposed between the common electrode and the pixel electrode,
wherein the pixel electrode has an extension portion overlapping a second gate line of an adjacent pixel region and an opening in the extension portion overlapping the second gate line,
wherein a portion of the common electrode between the first slits is located in the second slit,
wherein a portion of the pixel electrode between the second slits is located in the first slit, and
wherein the pixel electrode and the common electrode are transparent while the common line is non-transparent.

18. The liquid crystal display device according to claim 17, further comprising a second substrate for attachment to the first substrate, the second substrate comprising a black matrix only in correspondence to the data line and thin film transistor on the first substrate.

* * * * *